United States Patent
Lockhart

(10) Patent No.: US 9,567,707 B2
(45) Date of Patent: Feb. 14, 2017

(54) PURIFICATION PROCESS FOR PARTLY-HYDROLYZED CELLULOSE

(75) Inventor: James M. Lockhart, Vancouver (CA)

(73) Assignee: NORAM Engineering and Constructors Ltd., Vancouver, BC (CA)

( * ) Notice: Subject to any disclaimer, the term of this patent is extended or adjusted under 35 U.S.C. 154(b) by 129 days.

(21) Appl. No.: 14/422,619

(22) PCT Filed: Aug. 21, 2012

(86) PCT No.: PCT/CA2012/050575
§ 371 (c)(1),
(2), (4) Date: Feb. 19, 2015

(87) PCT Pub. No.: WO2014/029001
PCT Pub. Date: Feb. 27, 2014

(65) Prior Publication Data
US 2015/0233056 A1    Aug. 20, 2015

(51) Int. Cl.
| | |
|---|---|
| C08B 15/02 | (2006.01) |
| C08B 1/00 | (2006.01) |
| C08L 1/04 | (2006.01) |
| A61K 31/717 | (2006.01) |
| D21H 11/04 | (2006.01) |
| D21C 11/00 | (2006.01) |
| D21C 3/02 | (2006.01) |
| D21C 3/04 | (2006.01) |

(52) U.S. Cl.
CPC .............. *D21H 11/04* (2013.01); *C08B 15/02* (2013.01); *D21C 3/02* (2013.01); *D21C 3/04* (2013.01); *D21C 11/0007* (2013.01)

(58) Field of Classification Search
CPC .............. C08B 15/02; C08B 1/00; C08L 1/04; A61K 31/717
USPC ........................................................ 536/56
See application file for complete search history.

(56) References Cited

U.S. PATENT DOCUMENTS

| | | |
|---|---|---|
| 5,629,055 A | 5/1997 | Revol et al. |
| 2005/0239744 A1 | 10/2005 | Ioelovich et al. |

FOREIGN PATENT DOCUMENTS

WO    WO 2010/066036    6/2010

OTHER PUBLICATIONS

Tang Lirong, et al.; "Preparation and characterization of nanocrystal cellulose;" Scientia Silvae Sinicae, vol. 47, No. 9, pp. 119-122; published Sep. 30, 2011.
Ying Wulin (chief editor); "Analytic Chemistry;" China Ocean University Press, pp. 212-213; published Jul. 2003.
Jiang Jiang, et al.; "Inorganic and analytical chemistry;" Xiamen University Press, pp. 193-194; published May 2012.
Peng, B.L. et al., "Chemistry and application of nanycrystalline cellulose and its derivatives: a nanotechnology . . . ," The Canadian Journal of Chem. Engrg., vol. 9999:1-16, 201.
Revol, J-F. et al., "Chiral nematic suspensions of cellulose crystallites; phase separation and magnetic field orientation," Liquid Crystals, 1994, vol. 16, No. 1, pp. 127-134.
Dong, Xue Min et al., "Effects of Ionic Strenth on the Isotropic-Chiral Nematic Phase Transition of Suspensions of Cellulose . . . ," Langmuir, 1996, vol. 12, p. 2076-2082.
Gray et al., "Cellulose Nanocrystal Suspensions, Dept. of Chemistry, McGill Univ., 10th Int'l. Conf.on Wood and Other Biofibre Plastic Composites," Madison, WI, May 13, 2009.
International Preliminary Report on Patentability with Written Opinion issued by CIPO dated Feb. 24, 2015.
"Modern use of biomass energy," edited by Wu Chuangzhi, Beijing: Chemical Industry Press, p. 187, published May 2003, cited in corresponding Chinese Office Action dated Oct. 26, 2016.

*Primary Examiner* — Sudhakar Katakam
*Assistant Examiner* — Everett White
(74) *Attorney, Agent, or Firm* — Walter | Haverfield LLP; D. Peter Hochberg; Sean F. Mellino

(57) ABSTRACT

A method of recovering purified partly-hydrolyzed cellulose (36) from a composition (14) comprising partly-hydrolyzed cellulose and an acid, such as sulfuric acid. A base (28) having a cation that forms a precipitate with the anion of the acid is added to the composition. For example, a base such as barium hydroxide is added to form a sulfate precipitate. The precipitate (38) is then separated from the partly-hydrolyzed cellulose (36), thus reducing its acid content. The method may include additional steps of centrifugation (18) of the composition, breaking-up agglomerations (44) in the composition after precipitation, and dialysis (42).

30 Claims, 6 Drawing Sheets

PURIFICATION PROCESS FOR PARTLY-HYDROLYZED CELLULOSE

CROSS-REFERENCE TO RELATED APPLICATIONS

This application is a National Stage application of International Application No. PCT/CA2012/050575 filed on Aug. 21, 2012, which is incorporated herein by reference in its entirety.

BACKGROUND OF THE INVENTION

Field of the Invention

The invention pertains to processes for washing partly-hydrolyzed cellulose to remove acid to low levels.

Background of the Invention

The following references describe the process steps which have been employed to produce partly-hydrolyzed cellulose in the prior art literature and are discussed below, such as (1) U.S. Pat. No. 5,629,055 to Revol et al.; (2) Jean-François Revol, Louis Godbout, Xue-Min Dong, Derek G. Gray, Henri Chanzy, and Georg Maret, "Chiral nematic suspensions of cellulose crystallites; phase separation and magnetic field orientation," *Liquid Crystals*, (1994) Vol. 16, No. 1: 127; and (3) Xue Min Dong, Tsunehisa Kimura, Jean-Francois Revol, and Derek G. Gray, "Effects of Ionic Strength on the Isotropic-Chiral Nematic Phase Transition of Suspensions of Cellulose Crystallites," *Langmuir*, (1996) Vol. 12: 2076.

Partly-hydrolyzed cellulose (also referred to in the literature as cellulose crystallites or nanocrystalline cellulose) is most commonly produced by the controlled acid hydrolysis of cellulose using sulfuric acid. The cellulose may be from various sources, including wood pulp and cotton. The less dense amorphous regions along the cellulose microfibril are more susceptible to acid attack during hydrolysis and cleave to give the partly-hydrolyzed cellulose. Acids other than sulfuric, such as hydrochloric acid, phosphoric acid, etc., or mixtures of acids, may be used. For simplicity of explanation, the following discussion focuses on the use of sulfuric acid and the removal of sulfate.

At high ionic strengths, such as that caused by the residual sulfuric acid from hydrolysis, the individual nano-particles of crystalline cellulose tend to agglomerate together into larger particles which settle under gravity, or in a centrifuge. To obtain the desired discrete nano-particles, the ionic strength of the solution must be reduced to very low levels. To achieve this desired purification, one or more steps of dilution followed by centrifugation are typically employed to separate the bulk of the sulfuric acid (about 90%) from the partly-hydrolyzed cellulose; however, as the acid concentration and associated ionic strength decrease, the partly-hydrolyzed cellulose particles deagglomerate into smaller aggregates to a point where they are too small to be collected efficiently in a centrifuge and alternative methods must be employed to further reduce the acid concentration.

To achieve the desired final purity of the partly-hydrolyzed cellulose suspension, a very fine filter which retains the partly-hydrolyzed cellulose particles combined with continuous or step-wise water washing is typically employed. This washing step is often referred to in the literature as dialysis or diafiltration.

Although a significant portion of the starting acid has usually been removed previously by centrifugation, purity targets for partly-hydrolyzed cellulose are such that acid concentrations must be further reduced by several orders of magnitude. Even with a highly efficient dialysis system, very large filtration surface areas and flow rates are required relative to the quantity of partly-hydrolyzed cellulose produced, leading to high capital and operating costs, water usage and layout requirements, especially at larger scales.

While generally improving overall viability, centrifugation is not strictly required as an initial purification step. The desired final purity can be achieved using dialysis alone; however, this increases dialysis washing requirements and acid recovery costs significantly.

The prior art purification process described above also removes sugars produced in hydrolysis as well as other soluble impurities; however, these are typically present in lower quantities than the sulfuric acid such that their removal is not normally the limiting factor in the purification of partly-hydrolyzed cellulose.

As described in the prior art indicated above, partly-hydrolyzed cellulose particles produced using sulfuric acid generally contain sulfate groups which are weakly acidic. Once the ionic strength has been reduced to sufficiently low levels, the partly-hydrolyzed cellulose suspension is typically dispersed using sonication or other high shear operation. In addition the partly-hydrolyzed cellulose suspension is usually neutralized with NaOH, or other base to improve the partly-hydrolyzed cellulose thermal stability and redispersability (if dried). Bases containing divalent cations, such as $Ca^{++}$ and $Ba^{++}$ are known to interfere with ordered phase formation such as the formation of iridescent films, etc. and so their presence in the final product is undesirable for many applications: "Cellulose Nanocrystal Suspensions," Dr. Gray, D., Dept. of Chemistry, McGill University, 10th International Conference on Wood and Other Biofibre Plastic Composites, Madison, Wis., May 13, 2009.

SUMMARY OF THE INVENTION

The invention provides a method for removing acid from a composition containing partly-hydrolyzed cellulose particles, that is, for recovering purified partly-hydrolyzed cellulose from a composition comprising partly-hydrolyzed cellulose and acid. The invention reduces the requirements for high capital and operating costs, water usage and large filtration surface areas typical of the prior art processes.

According to one embodiment of the invention, there is provided a method of recovering purified partly-hydrolyzed cellulose from a composition comprising partly-hydrolyzed cellulose and an acid, comprising the steps of adding to the composition a base having a cation that forms a precipitate with an anion of the acid, thereby forming the precipitate, and separating the partly-hydrolyzed cellulose from the precipitate.

According to a further embodiment of the invention, there is provided a method of recovering purified partly-hydrolyzed cellulose from a composition comprising partly-hydrolyzed cellulose and sulfuric acid, comprising the steps of adding to the composition a base having a cation which forms a sulfate-containing precipitate, and separating the partly-hydrolyzed cellulose from the sulfate-containing precipitate.

According to further embodiments of the invention, the method may include one or more of the following steps: diluting the composition and centrifuging the diluted composition to remove acid, prior to adding the base; breaking up agglomerations in the composition after precipitation; applying dialysis, or partial dialysis, to the composition comprising partly-hydrolyzed cellulose and acid, or to the partly-hydrolyzed cellulose product after separation from the precipitate.

Further aspects of the invention and features of specific embodiments are described below.

DETAILED DESCRIPTION

Figure 1:
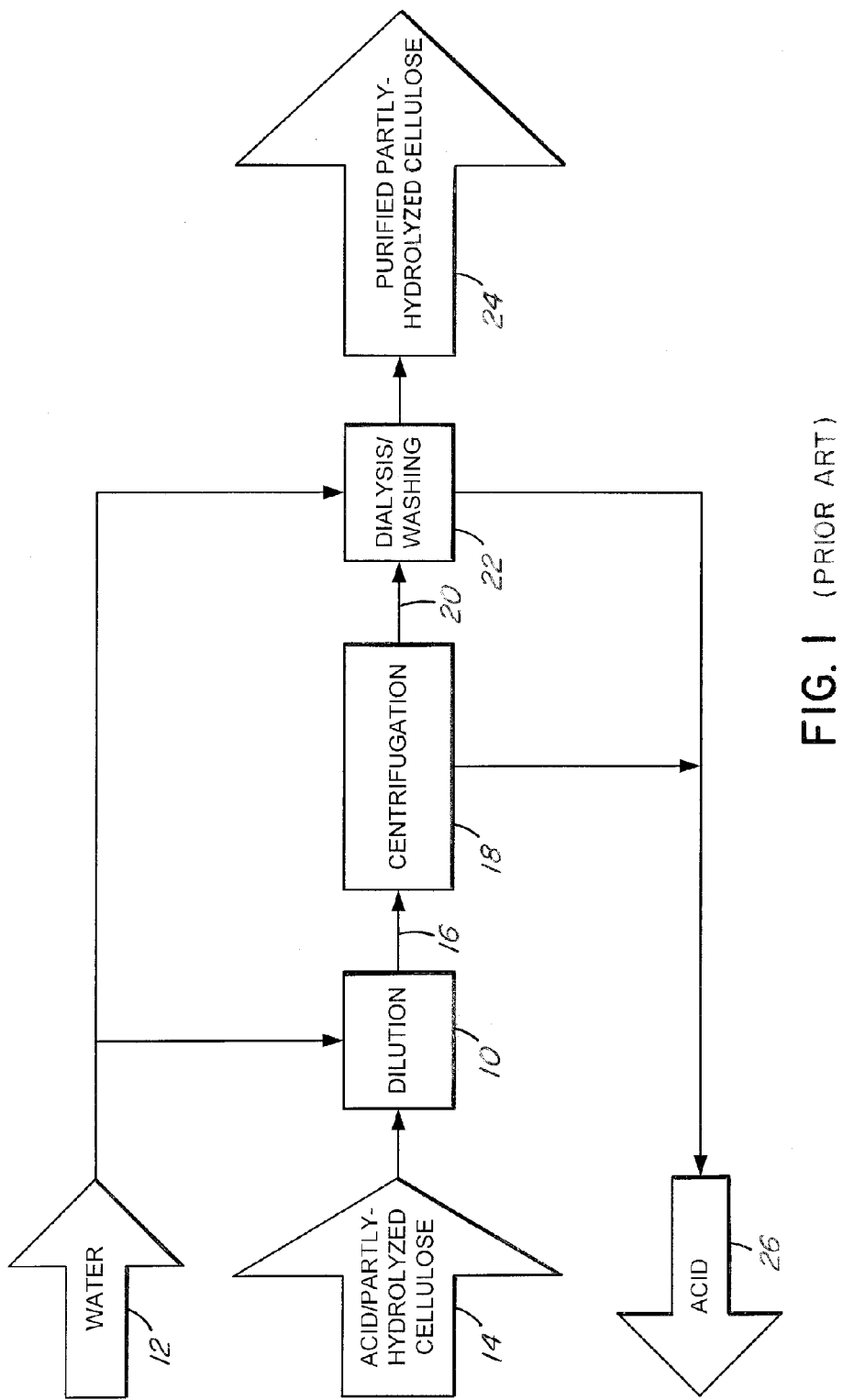
FIG. 1 is a schematic diagram of a prior art process for removing sulfuric acid from a composition comprising partly-hydrolyzed cellulose particles and sulfuric acid.

In this description and in the drawings, corresponding and like elements are identified by the same reference characters.

Compositions comprising partly-hydrolyzed cellulose particles and sulfuric acid may be prepared according to methods well-known in the art, i.e. by the hydrolysis of natural cellulosic materials such as wood pulp. Typically, finely-ground bleached chemical pulp is reacted with sulfuric acid at an elevated temperature and with continuous mixing. After the hydrolysis is completed to the extent required, the mixture is quenched with water. The resulting composition is typically in the form of a suspension, solution, colloid or gel.

A prior art process for removing sulfuric acid from a composition comprising partly-hydrolyzed cellulose and sulfuric acid is depicted in FIG. 1. A dilution step 10 is done by adding a stream of water or dilute acid 12 to the composition 14 of partly-hydrolyzed cellulose and sulfuric acid. The diluted composition 16 is subjected to centrifugation 18. These two steps may be repeated as required. Following centrifugation, the concentrated partly-hydrolyzed cellulose composition 20 is subjected to dialysis 22. The dialysis step may be done by means of continuous or step-wise addition of water, or by batch washing. The dialysis produces the purified partly-hydrolyzed cellulose 24. Both the dialysis step 22 and the centrifugation step 18 produce a stream of waste acid 26, as sulfuric acid is removed from the composition.

Although sulfuric acid is commonly the acid used to prepare partly-hydrolyzed cellulose, as mentioned above, other acids such as hydrochloric acid and phosphoric acid, and mixtures of acids, may be used. The present invention for purifying partly-hydrolyzed cellulose applies generally to the partly-hydrolyzed cellulose-acid mixtures resulting from such operations. This is done by selecting a base whose cation has a suitably low solubility product when combined with the anion of the acid. For example, aluminum hydroxide can be selected as the base where the acid in the partly-hydrolyzed-acid mixture is phosphoric acid, to precipitate aluminum phosphate. In the description below, and in the drawings, the method of the invention is described for the case in which the acid in the partly-hydrolyzed cellulose-acid mixture is sulfuric acid, as one example of the mixtures to which the invention may be applied.

Figure 2:
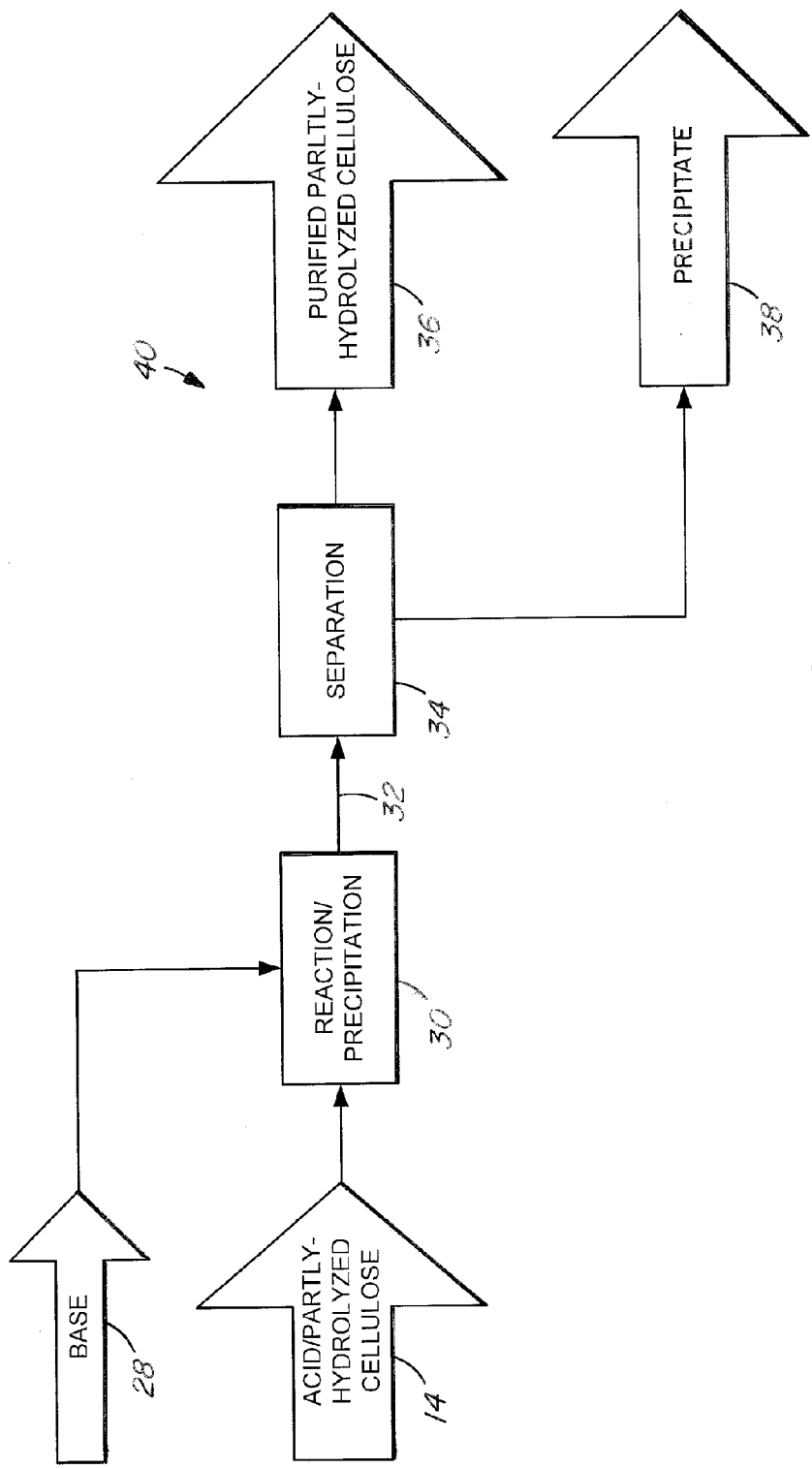
FIG. 2 is a schematic diagram of one embodiment of a process according to the invention for purifying partly-hydrolyzed cellulose.

Referring to FIG. 2, which illustrates a basic embodiment of the process 40 of the invention, a base 28 is reacted 30 with a composition 14 of partly-hydrolyzed cellulose and sulfuric acid to precipitate sulfate. The base may contain a divalent cation, such as barium, calcium, lead, mercury, radium, silver, strontium, etc., with a low sulfate solubility. For example, the base may be barium hydroxide, $Ba(OH)_2$ or barium carbonate, $BaCO_3$. The solubility product of the precipitate is preferably less than $10^{-4}$, and more preferably less than $2\times10^{-10}$. The mixture 32 produced by the precipitation reaction 30 is subjected to a separation step 34. This separation may be done by any suitable means, including one or more of settling, centrifugation and filtration. The separation results in purified partly-hydrolyzed cellulose 36 and the sulfate precipitate 38, for example, barium sulfate.

Figure 3:
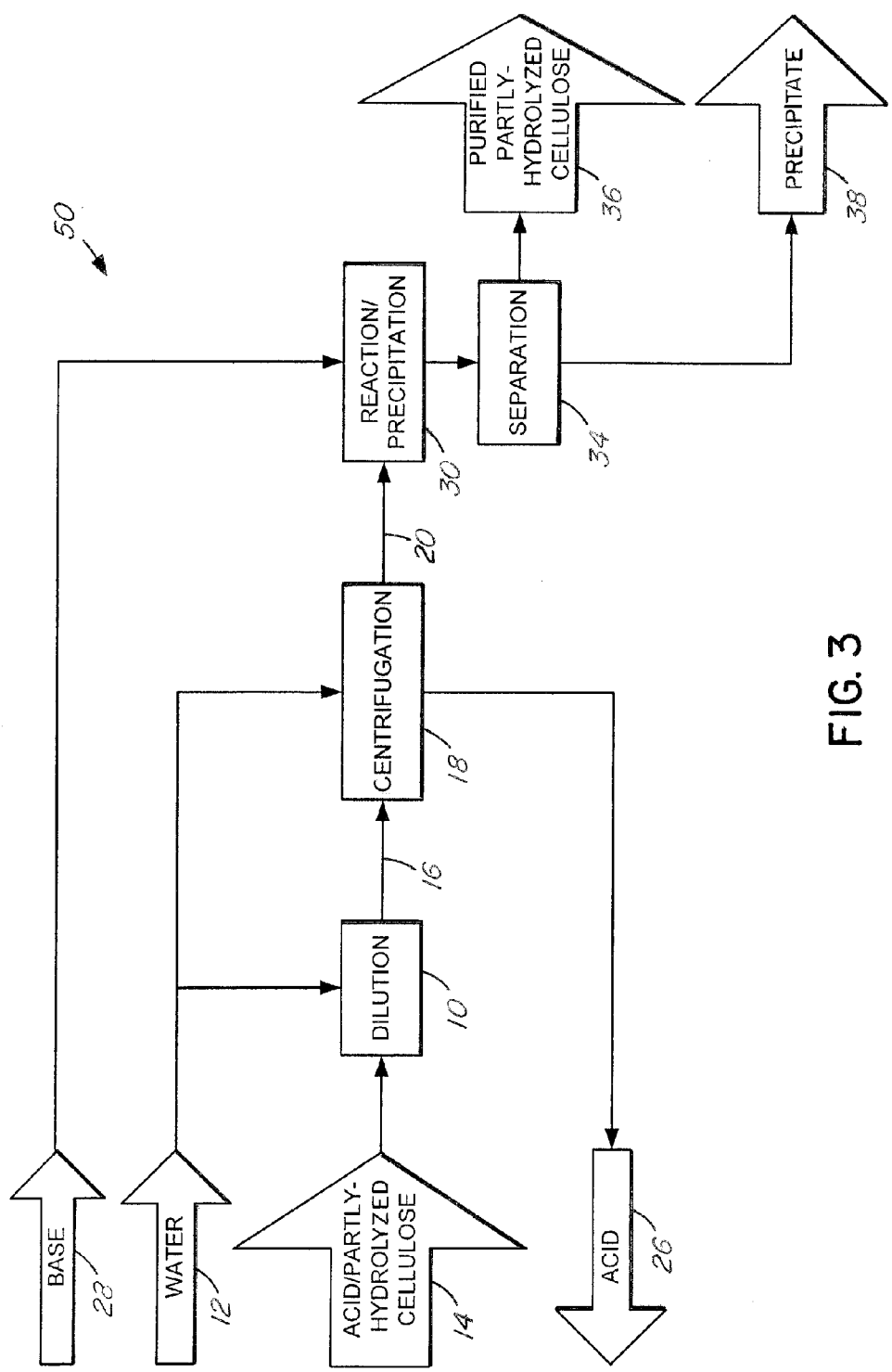
FIG. 3 is a schematic diagram of a second embodiment of the purification process, incorporating upstream acid removal by centrifugation.

FIG. 3 depicts a further embodiment of the process 50 in which the prior art steps of dilution 10 and centrifugation 18 are added to the precipitation 30 and separation 34 steps of the FIG. 2 process 40. This is desirable in order to reduce the costs associated with high base usage, precipitate disposal and acid make-up. The dilution 10 and centrifugation 18 steps are done upstream of the precipitation 30 step and may be repeated as desired. One or more steps of centrifugation 18 are utilized to minimize the acid concentration prior to employing the precipitation purification steps. Greater than approximately 90% of the initial acid can be removed via the dilution 10 and centrifugation 18 steps producing a suspension of about 2 to 5 wt % partly-hydrolyzed at a pH of about 1.0. Assuming a partly-hydrolyzed cellulose to free sulfate (not bound chemically to partly-hydrolyzed cellulose) at the midpoint of this range indicates a ratio of about 0.4 g free $SO_4$ per gram of partly-hydrolyzed cellulose. Final purity targets are equivalent to less than $\frac{1}{1000}^{th}$ the acid or less. Removal of the free acid to at or near final purity levels would require base addition equivalent to about 0.7 g of $Ba(OH)_2$ per gram of partly-hydrolyzed cellulose and would produce about 1.0 g of $BaSO_4$ precipitate per gram of partly-hydrolyzed cellulose. Partly-hydrolyzed cellulose losses associated with the precipitate removal would be about 5%, assuming about 2% carbon in the sulfate precipitate, and about 39% carbon in partly-hydrolyzed cellulose, but would dramatically reduce or eliminate any dialysis washing and purification requirements.

Figure 4:
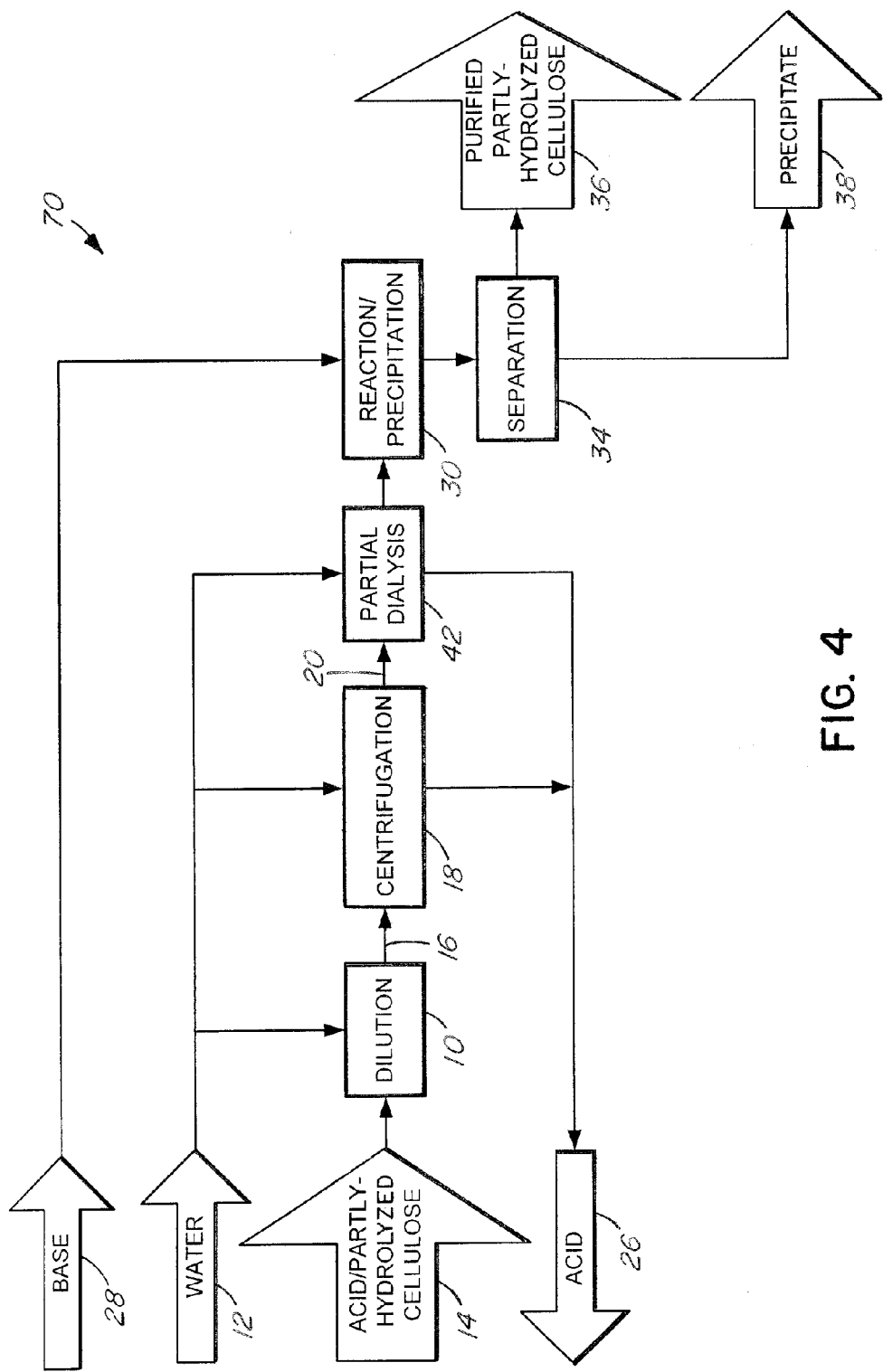
FIG. 4 is a schematic diagram of a third embodiment of the purification process, incorporating upstream acid removal by centrifugation and partial dialysis.

FIG. 4 depicts a further embodiment of the process 70 which is enhanced, relative to the process 50 of FIG. 3, by the addition of a step of partial dialysis 42 after the step of centrifugation 18 and before the step of precipitation 30. Dialysis typically lowers the acid levels by several hundred or thousand times that achieved by centrifugation alone. The dialysis system capacity and cost are roughly proportional to the log of the removal rate required. Thus, a roughly 10-fold reduction in acid to partly-hydrolyzed cellulose ratio would require only about ⅓ the dialysis capacity required to achieve a 1,000-fold reduction. However, this same 10-fold reduction in the starting free acid concentration would reduce the base usage and associated sulfate precipitate and partly-hydrolyzed cellulose losses by 10-fold, such that improved overall economics may be achieved.

The dialysis 42 may be done for example using dialysis ultrafiltration membrane bags submersed in a vat of de-ionized water, maintaining a flow of water to the vat, to wash the free acid 26 from the partly-hydrolyzed cellulose suspension. The suspension is then subjected to the steps of precipitation 30 and separation 34, to produce purified partly-hydrolyzed cellulose 36 and the sulfate precipitate 38. The dialysis step 42 may be done by means of continuous or step-wise addition of water, or by batch washing.

Figure 5:
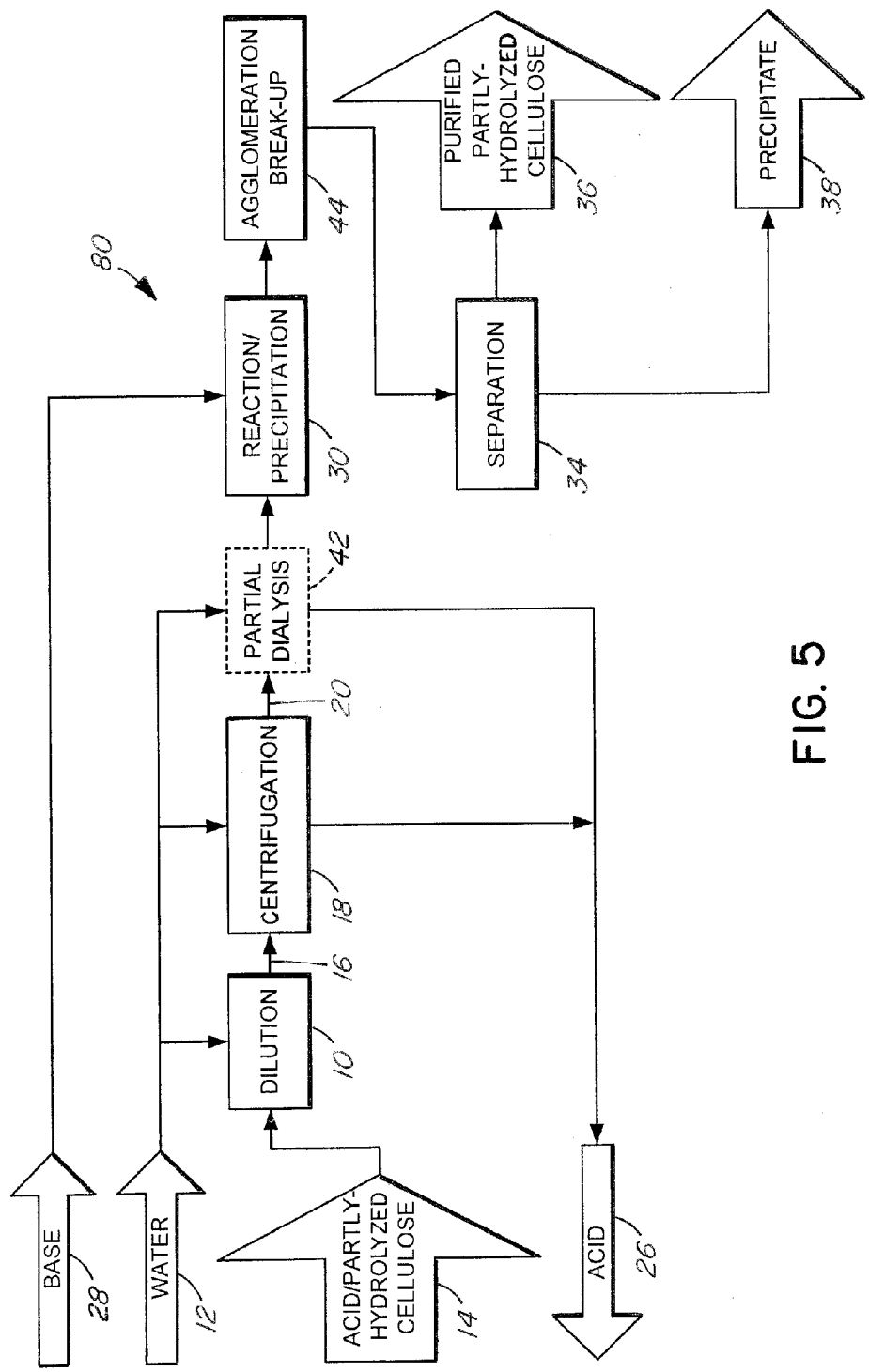
FIG. 5 is a schematic diagram of a fourth embodiment of the purification process, incorporating agglomeration break-up by sonication or other high shear operation.

FIG. 5 depicts a further embodiment of the process 80 which is enhanced, relative to the process 70 of FIG. 4, by including a step of agglomeration break-up 44 using sonication or other high shear operation to disperse or separate the partly-hydrolyzed cellulose particles after the precipitation step 30 and before the separation step 34.

The agglomeration break-up step 44 may be done utilizing high pressure, high shear or ultrasonic devices that are commonly employed following the purification of partly-hydrolyzed cellulose by prior art techniques. We have found that a significant reduction (about 33%) of the partly-hydrolyzed cellulose losses associated with the sulfate precipitate removal may be achieved through the use of agglomeration break-up prior to the precipitate separation without significantly increasing the cation concentration in the final partly-hydrolyzed cellulose product 36.

In the purification process 80, the step of partial dialysis 42 is optional. The process can therefore include all the steps as shown in FIG. 5, or the dialysis step 42 can be omitted, in which case the concentrated partly-hydrolyzed cellulose 20 from centrifugation 18 is fed to the precipitation step 30.

Figure 6:
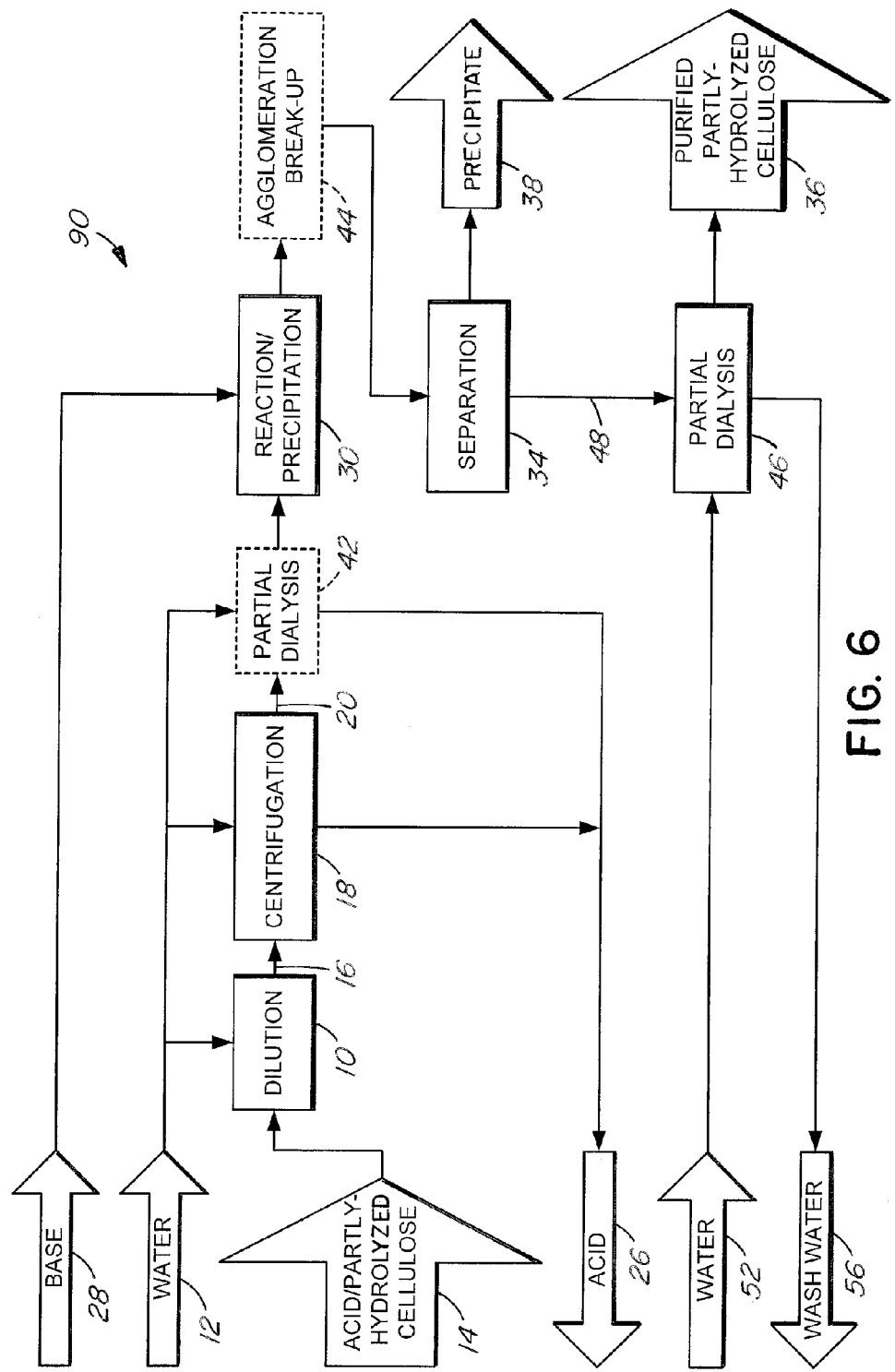
FIG. 6 is a schematic diagram of a fifth embodiment of the purification process, incorporating a downstream dialysis polishing step.

FIG. 6 depicts a further embodiment of the process 90 which is enhanced, relative to the process 80 of FIG. 5, by the addition of a step of partial dialysis 46 of the filtrate 48 from the separation step 34. A stream of water or dilute acid 52 is fed to the partial dialysis step 46 and a waste stream 56 of water, residual acid and impurities associated with the base addition is removed. The level of free acid (sulfate) removal is limited by the amount of cation used to precipitate the sulfate which can remain in solution (and its solubility product). For example when barium is used, the theoretical minimum free sulfate concentration is about $1.5 \times 10^{-5}$ mol/L for a maximum residual barium concentration of about 1 mg/L based on a solubility product of $1.1 \times 10^{-10}$ for $BaSO_4$. This residual sulfate concentration is believed low enough for most applications; however, if lower acid concentrations are required than can be achieved given residual cation requirements, the precipitation and separation steps may be followed with a smaller final dialysis polishing step 46 as depicted in FIG. 6. This arrangement allows higher levels of overall acid removal, while minimizing the remaining cation concentration and any impurities associated with the base addition.

In the purification process 90, the step of partial dialysis 42 prior to precipitation 30 and the step of homogenization 44 following precipitation 30, are optional. The process can therefore include all the steps as shown in FIG. 6, or it can omit one or both of the partial dialysis 42 and agglomeration break-up 44 steps.

EXAMPLES

A suspension of partly-hydrolyzed cellulose particles in sulfuric acid was produced according to a method similar to that described in U.S. Pat. No. 5,629,055 Revol et al., as described in detail below. This mixture was purified using several stages of dilution and centrifugation until a colloidal suspension which would no longer easily concentrate by centrifugation was produced. This typically corresponded to a pH of greater than about 1.0 to 1.5. These partially purified suspensions were then diluted and treated with $Ba(OH)_2$ to achieve several different final pHs and the treated suspensions were settled and/or centrifuged and filtered to remove the sulfate precipitate.

In order to assess whether the sulfate precipitate produced may form on the partly-hydrolyzed cellulose particles or whether the removal of the sulfate precipitate would also capture and remove a significant fraction of the partly-hydrolyzed cellulose particles, the sulfate precipitate produced in the experiments was analyzed for carbon, which would be indicative of partly-hydrolyzed cellulose. This work found that carbon was present in the sulfate precipitate at a rate of about 2 wt % regardless of the starting or final pH, such that partly-hydrolyzed cellulose losses were roughly proportional to the amount of acid removed by this technique. Residual acid requirements are sufficiently low that very little acid need be removed by this technique for it to have a dramatic impact on the purification system requirements and cost.

A determination was also made as to whether the cation used to precipitate the sulfate might persist in solution and/or bind with the partly-hydrolyzed cellulose such that it would be present in the final purified product at significant concentrations, which may be undesirable for many potential uses of the partly-hydrolyzed cellulose. Analysis of the purified partly-hydrolyzed cellulose product produced using the process of the invention indicated that high sulfate removal rates could be achieved with very low levels of the cation used remaining in solution (<1 mg/L Ba in most experiments). This work appears to confirm that the cation used did not bind directly with the sulfate groups on the partly-hydrolyzed cellulose, nor was the precipitate so fine that it could not be removed via centrifugation and/or filtration. Instead it was found that residual cation levels could be reduced to very low levels, similar to that predicted from the amount of free sulfate in solution and the solubility product of that particular cation.

Example 1

10 g of finely ground bleached Kraft pulp were reacted with 130 g of 63% $H_2SO_4$ in a continuously mixed beaker in a water bath at 46° C. for 60 minutes. This mixture was the quenched with 1500 mL of de-ionized (DI) water, and allowed to settle overnight. In the morning the clear supernatant layer was decanted off and the about 400 g remaining suspension was divided into 12-30 mL aliquots which were treated in a lab-scale batch centrifuge for 10 minutes at 1,100 rpm. The aliquots were then decanted, refilled with DI water, and treated again in the centrifuge two more times until the suspension no longer separated. This corresponded to a pH of about 1.2. The 12 individual aliquots were then recombined, and mixed. New aliquots of 5 mL were removed, diluted 10 fold with DI water and titrated with a solution of 5.5 g/L $Ba(OH)_2$ to different final pH values as indicated by the results summarized below in Table 1 (Example 1a: 2.3, Example 1b: 2.5, Example 1c: 2.7, Example 1d: 3.5, Example 1e: 6 to 7). The resulting suspensions were divided into two 30 mL aliquots, and treated in the lab-scale centrifuge at 2,220 rpm for 30 minutes. The supernatant containing colloidal partly-hydrolyzed cellulose was then decanted, treated by sonication for 90 minutes, filtered through a 0.3 micron filter and dried overnight at 40 degrees C. into a thin film. Prior to drying, a 2 mL sample of filtered supernatant was analyzed for barium. The solid cake removed via centrifuging was dried overnight, weighed and analyzed for carbon content. The loss of partly-hydrolyzed cellulose with the sulfate precipitate was estimated assuming all carbon was from partly-hydrolyzed cellulose, and that it represents 39% of the partly-hydrolyzed cellulose mass. The yield loss associated with precipitation was then calculated by dividing the estimated partly-hydrolyzed cellulose in the sulfate precipitate by the proportion of the original pulp charge, relative to the aliquot sized treated by this method.

Example 2

Example 2 was identical to Example 1b in all respects except that the aliquot of centrifuge-washed partly-hydrolyzed cellulose was treated with $Ba(OH)_2$ without the 10-fold DI dilution. This experiment showed higher levels base required as well as higher levels of carbon in the sulfate precipitate, which corresponded to a higher level of partly-hydrolyzed cellulose loss. The results are shown in Table 1.

Example 3

Example 3 shows the results of an experiment identical to Example 1b, with the variation that it was treated by sonication for 90 minutes following treatment with $Ba(OH)_2$ but prior to centrifugation to remove the sulfate precipitate. The results of this experiment are summarized in Table 1 and show a reduction in the percentage of carbon in the sulfate precipitate, and thus a reduction in the loss of partly-hydrolyzed cellulose. It is possible that agglomeration break-up prior to base addition and precipitation may also be effective.

Examples 4 and 5

A batch of partly-hydrolyzed cellulose was produced by a method identical to that indicated in Example 1, with the exception that the acid and pulp were reacted for only 35 minutes (rather than 60) prior to quenching and centrifuge washing as described above. The resulting suspension of washed partly-hydrolyzed cellulose having a pH of about 1.5, was divided into several aliquots and placed inside dialysis ultrafiltration membrane dialysis bags and submersed in a vat containing DI water. A flow of DI water was maintained to the vat and overflowed a weakly acidic solution, thus slowly washing the free acid from the partly-hydrolyzed cellulose suspension. Four samples were dialyzed for 0, 4, 15 and 20 hours before being removed from the vat and diluted 4 times with DI water. Following dilution, the 15 and 20 hour samples were already above the final target pH. Both the 0 and 4 hour dialyzed samples were titrated with 5.5 g/L $Ba(OH)_2$ solution to a final pH of 3.2. These two samples were then centrifuged for 30 minutes at 2,200 rpm. The supernatant was then decanted off, treated by sonication for 90 minutes, filtered through a 0.3 micron filter and dried overnight at 40 degrees C. to a thin film. The precipitate collected from centrifuging was dried and then analyzed for carbon. Samples of the filtered supernatant were also extracted and analyzed for barium. The results of these experiments are shown in Table 2 below as Examples 4 and 5. The partially dialyzed sample showed a similar percentage of carbon in the precipitate; however since much less $Ba(OH)_2$ was required, producing less sulfate precipitate, the overall loss of partly-hydrolyzed cellulose was reduced significantly. Both samples showed similar levels of barium left in solution, about 0.8 mg/L.

TABLE 1

| Example No. | 1a | 1b | 1c | 1d | 1e | 2 | 3 |
|---|---|---|---|---|---|---|---|
| pH following $Ba(OH)_2$ | 2.3 | 2.5 | 2.7 | 3.5 | 6 to 7 | 2.5 | 2.5 |
| Dried precipitate mass (g) | 0.11 | 0.16 | 0.18 | 0.18 | | 0.27 | 0.19 |
| Carbon in dried precipitate (wt %) | 2.1 | 2.3 | 1.7 | 1.7 | | 4.3 | 1.5 |
| Calculated partly-hydrolyzed cellulose in precipitate (g) | 0.0059 | 0.0094 | 0.0078 | 0.0078 | | 0.0298 | 0.0073 |
| Calculated yield loss (%) | 3.2 | 4.0 | 4.4 | 3.1 | | 14.2 | 2.1 |
| Ba in filtrate (mg/L) | 0.73 | 0.4 | 0.5 | 2.3 | 39.5 | 3.6 | 0.6 |

TABLE 2

| Example No. | 5 | 6 |
|---|---|---|
| Dialysis time (hrs) | 0 | 4 |
| Starting pH | 1.5 | 2.3 |
| Dried precipitate mass (g) | 0.1448 | 0.0075 |
| Carbon in dried precipitate (wt %) | 1.7 | 5.2 |
| Calculated partly-hydrolyzed cellulose in precipitate (g) | 0.00631 | 0.00100 |
| Calculated yield loss (%) | 1.9 | 0.24 |
| Ba in filtrate (mg/L) | 0.79 | 0.84 |

As will be apparent to those skilled in the art in light of the foregoing disclosure, many alterations and modifications are possible in the practice of this invention without departing from the scope thereof. Accordingly, the scope of the invention is to be construed in accordance with the following claims.

The invention claimed is:

1. A method of recovering purified partly-hydrolyzed cellulose from a composition comprising partly-hydrolyzed cellulose and an acid, comprising the steps of:
    (a) adding a base to the composition of partly-hydrolyzed cellulose and acid, said base having a cation that forms a precipitate with an anion of the acid, thereby forming the precipitate; and
    (b) separating the partly-hydrolyzed cellulose in the product of step (a) from the precipitate.

2. The method according to claim 1, further comprising, before step (a), the step of diluting the composition and centrifuging the diluted composition to remove the acid.

3. The method according to claim 1, further comprising, after step (a) and before (b), a step of agglomeration break-up of the product of step (a).

4. The method according to claim 1, further comprising, before step (a), a step of dialysis of the composition comprising partly-hydrolyzed cellulose and acid.

5. The method according to claim 1, further comprising, after step (b), a step of dialysis of the partly-hydrolyzed cellulose product of step (b).

6. The method according to claim 1, wherein step (b) is done by at least one selected from the group consisting more of settling, centrifuging and filtering, and combinations thereof.

7. The method according to claim 1, wherein the composition comprising partly-hydrolyzed cellulose and acid is one selected from the group consisting of a suspension, a solution, a colloid and a gel.

8. The method according to claim 1, wherein the acid is sulphuric acid.

9. The method according to claim 1, wherein the acid is phosphoric acid.

10. The method according to claim 1, wherein the base is barium hydroxide.

11. The method according to claim 1, wherein the base is barium carbonate.

12. The method according to claim 1, wherein the base is aluminum hydroxide.

13. The method according to claim 1, wherein the cation is selected such that the precipitate that forms in step (a) has low solubility in the composition.

14. The method according to claim 1, wherein the precipitate that forms in step (a) has a solubility product less than $10^{-4}$.

15. The method according to claim 1, wherein the precipitate that forms in step (a) has a solubility product less than $2 \times 10^{-10}$.

16. The method according to claim 1, wherein the cation is divalent.

17. The method according to claim 1, wherein the cation is one selected from the group consisting of barium, calcium, lead, mercury, radium, silver, strontium and aluminum.

18. A method of recovering purified partly-hydrolyzed cellulose from a composition comprising partly-hydrolyzed cellulose and sulfuric acid, comprising the steps of:

(a) adding a base to the composition of partly-hydrolyzed cellulose and acid, said base having a cation that forms with the sulfate anion of the sulfuric acid a sulfate-containing precipitate, thereby forming the sulfate-containing precipitate; and (b) separating the partly-hydrolyzed cellulose in the product of step (a) from the sulfate-containing precipitate.

19. The method according to claim 18, further comprising, before step (a), the step of diluting the composition and centrifuging the diluted composition to remove acid.

20. The method according to claim 18, further comprising, after step (a) and before (b), a step of agglomeration break-up of the product of step (a).

21. The method according to claim 18, further comprising, before step (a), a step of dialysis of the composition comprising partly-hydrolyzed cellulose and sulfuric acid.

22. The method according to claim 18, further comprising, after step (b), a step of dialysis of the partly-hydrolyzed cellulose product of step (b).

23. The method according to claim 18, wherein step (b) is done by at least one selected from the group consisting of settling, centrifuging and filtering, and combinations thereof.

24. The method according to claim 18, wherein the composition comprising partly-hydrolyzed cellulose and sulfuric acid is one selected from the group consisting of a suspension, a solution, a colloid and a gel.

25. The method according to claim 18, wherein the precipitate that forms in step (a) has a solubility product less than $10^{-4}$.

26. The method according to claim 18, wherein the precipitate that forms in step (a) has a solubility product less than $2 \times 10^{-10}$.

27. The method according to claim 18, wherein the cation is divalent.

28. The method according to claim 18, wherein the cation is one selected from the group consisting of barium, calcium, lead, mercury, radium, silver and strontium.

29. The method according to claim 18, wherein the base is barium hydroxide.

30. The method according to claim 18, wherein the base is barium carbonate.

* * * * *